Nov. 19, 1935.  F. R. RUEPPEL ET AL  2,021,385
SPARE TIRE COVER
Filed Aug. 15, 1932   2 Sheets-Sheet 1

INVENTORS
FRED R. RUEPPEL
CHARLES W. BALLE
BY
ATTORNEYS

Nov. 19, 1935.   F. R. RUEPPEL ET AL   2,021,385
SPARE TIRE COVER
Filed Aug. 15, 1932   2 Sheets-Sheet 2
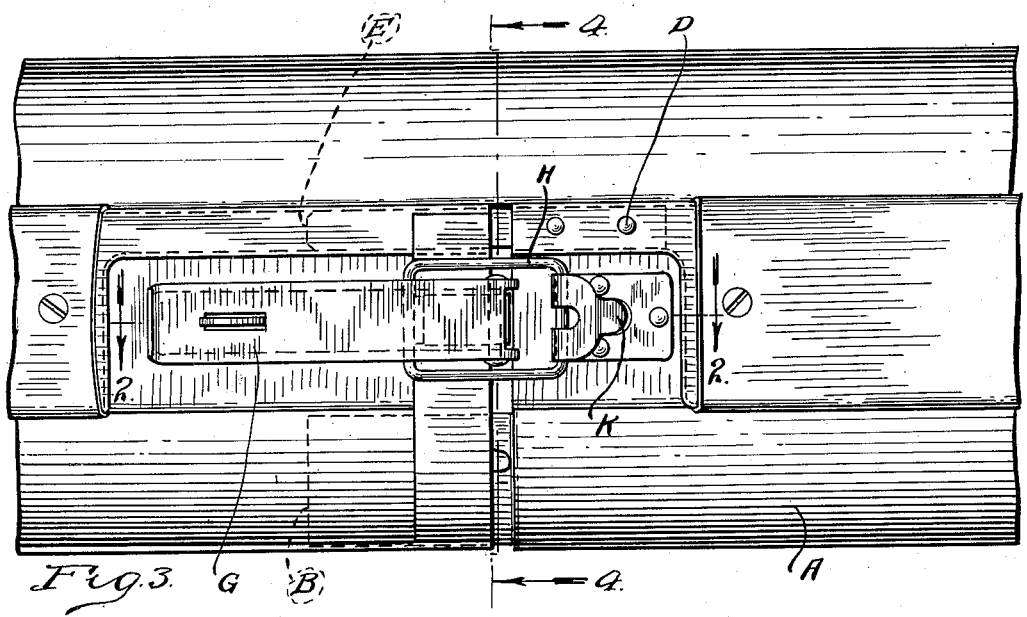
INVENTORS
FRED R. RUEPPEL
CHARLES W. BALLE
BY
Barnes, Kisselle & Laughlin
ATTORNEYS Patented Nov. 19, 1935

2,021,385

UNITED STATES PATENT OFFICE 2,021,385

SPARE TIRE COVER

Fred R. Rueppel, East Detroit, and Charles W. Balle, Detroit, Mich., assignors to Clayton & Lambert Manufacturing Company, Detroit, Mich., a corporation of Delaware Application August 15, 1932, Serial No. 628,798

6 Claims. (Cl. 150—54)

This invention relates to spare tire covers. It is common today to use spare tire covers made of metal. In most, if not all cases, it is necessary to fasten or clamp the cover on the spare tire before it is mounted on the tire carrier.

It is the object of the present invention to provide an arrangement of elements which permits the mounting of the tire cover on the tire while carried on the spare tire carrier. This is accomplished by means of a locking arrangement which allows a very large separation of the sections of the cover by reason of the detachable mounting of one of the elements of the locking device.

In the drawings:

Fig. 3 is an elevational view taken on the line 3—3 of Fig. 2.

Fig. 4 is a section on the line 4—4 of Fig. 3.

Fig. 5 is a sectional view of a modified form.

Fig. 6 is an elevational detail taken on the line 6—6 of Fig. 5.

In a type of spare tire carrier that is now quite extensively used, a split rear cover member or annulus is used and this secures the front and back of the tire cover to the tire when the split member is drawn together by a suitable clamp. A rear cover of this kind is shown at A. This has on one of the ends thereof a tab portion B which is adapted to slide into the turned over flange C. On the other side of the rear cover is a guide strip E spot welded on the end at D. This engages in a channel F formed by turning in the outside edge of the cover. The tab and the guide member E form tenons to prevent the ends of the rear cover getting out of registry when the ring is expanded.

A toggle clamp comprises a hinged toggle lever G which is provided with a loop H. Obviously when this toggle clamp is opened up there is a slight loosening of the annular cover A with respect to the tire by reason of slightly enlarging the perimeter of the ring. This, however, is only sufficient to permit the entry of the tire by throwing the cover down on the ground and then placing the tire in the back cover, then assembling the front cover A' over the tire and into the edge of the back cover and clamping the two cover parts together. There is not enough separation possible with the clamp to cause the back cover to be placed over the tire by entering the tire through the inside edge. The reason for this is that the inside edge designated I has a much less diameter than the outside edge J. (See Fig. 4.) Consequently, the tire can be gotten into the outside of the back cover but not from the inside.

By the arrangement which is about to be described it is possible to cause the tire to enter the inside opening in the cover A by reason of the relatively great spread that is possible with this back cover. This enables the assembled tire cover to be placed as a unit over the tire when on the carrier. This not only facilitates the placing of the cover onto the tire but obviates unnecessary handling of the separate cover members which are often dirty and obviates the lifting of both the tire and cover together onto the tire carrier which is not always an easy job with a large tire. Furthermore, it is very desirable in assembly lines in automobile factories to place the tire covers on the tires after they have been assembled on the carriers. This is not possible to do with the ordinary tire covers that have been heretofore used for this purpose and which employ a lever type of clamp.

Figure 1:
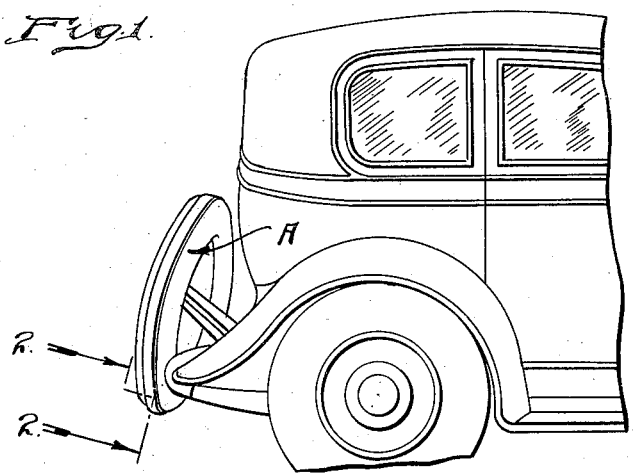
Fig. 1 is a fragmentary elevation showing a part of an automobile with a tire carrier, a tire and a cover in place.
Figure 2:
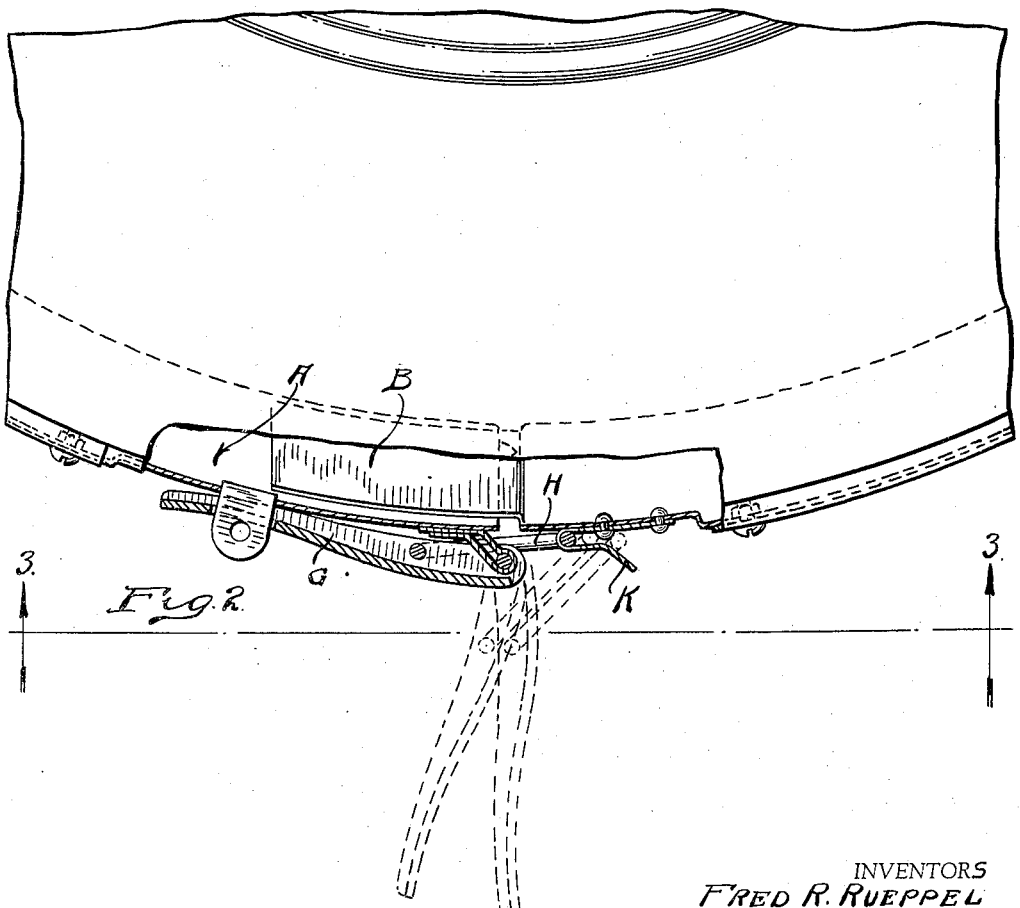
Fig. 2 is a section on the line 2—2 of Fig. 1 showing one form of clamp.

In order to accomplish this a loop H is held to one end by a spring clip K as shown in Figs. 2 and 3 or clamp M as shown in Figs. 5 and 6. This latter clip operates in conjunction with a press-in spring O as shown in these figures. That is, the spring can be pressed in slightly to allow the pivoted end of the loop to reach the gullet of the clip or conversely the spring may be pressed in slightly to release the pivoted portion of the loop from the gullet or journal bearing portion of the clip.

When the lever is thrown down against the cover as shown in Fig. 2 it will be seen that the loop has been thrown over the center on which the lever fulcrums and consequently the tendency of the split ring to expand only tightens the clamp. It will also be apparent that this type of clamp readily lends itself to the detachable journaling of one of the clamp arms to one of the ends of the split cover. No special fastening means is even required for the pull of the cover itself in tending to expand, securely locks the loop member in its journal bearing after the lever has been turned down. Furthermore, the special form of clip that we use, in conjunction with this particular form of lock has the further advantage of enabling the clamping lever to furnish a mechanical advantage in pulling the other pivoted arm of the toggle lock into its proper position.

What we claim is:

1. In a tire cover, a front cover member, a split rear cover member arranged to cooperate with the same and to clamp the front cover to the tire when the rear cover is contracted, said rear cover being provided with a clamping device having portions securable to each of the ends thereof for normally expanding and contracting said cover one of the portions being detachably securable to one of said ends so as to get a relatively large opening of the rear cover to permit the inner edge thereof to be fitted over the tire when the tire is mounted on the spare tire carrier.

2. In a tire cover, a cover member for one half of the tire, a split cover member arranged to cooperate with the same and to clamp the first member to the tire when the split member is contracted, said split member provided with a clamping device in the form of a pair of toggle levers connected together and arranged to throw over center to automatically hold the clamp in locked position, one of the levers having a detachable connection with one of the ends of the split member, and means for normally and resiliently maintaining said last named lever in engageable connection with said end.

3. In a tire cover, a cover member for one half of the tire, a split cover member arranged to cooperate with the same and to clamp the first member to the tire when the split member is contracted, said split member provided with a clamping device in the form of a pair of toggle levers arranged to throw over center to automatically hold the clamp in locked position, one of the levers arranged to engage with a clip and slide into a gullet thereof to form a detachable connection to permit a large separation of the split member to fit the same by its inner edge over the tire, a portion of said clip being resilient to normally maintain said connection.

4. In a tire cover, a cover member for one half of the tire, a split cover member arranged to cooperate with the same and to clamp the first member to the tire when the split member is contracted, said split member provided with a clamping device in the form of a pair of toggle arms arranged to throw over center to automatically hold the clamp in locked position, one of the arms in the form of a loop and the end of the split member being provided with an open clip into which said loop is arranged to fit and slide into the gullet of the clip to permit a large opening of the split member to fit the same at the inner side over the tire, a portion of said clip being resilient to normally maintain said connection.

5. In a tire cover, a cover member for one half of the tire, a split cover member arranged to cooperate with the same and to clamp the first member to the tire when the split member is contracted, said split member provided with a clamping device in the form of a pair of toggle arms arranged to throw over center to automatically hold the clamp in locked position, one of the arms in the form of a loop and the end of the split cover member being provided with an open clip into which said loop is arranged to fit and slide into the gullet of the clip to permit a large opening of the split member to fit the same with its inner edge of the tire, and a press in or snap spring for forming a retaining means with respect to the loop in the gullet of the clip.

6. In a tire cover, a front cover member, a split rear cover member arranged to cooperate with the same and to clamp the front cover to the tire when the rear cover is contracted, said rear cover being provided with a clamping device in the form of a pair of toggle levers connected together and each having a portion connected to one of the ends of the split cover and so arranged as to throw over center to automatically hold the contracted ends of the cover member in locked position, the connection between one of the toggle levers and the end of the cover being in the form of detachable clip means whereby the ends of the split cover member may be expanded longitudinally and transversely with respect to each other, whereby the split portion of the cover member may be passed over a tire cover support and around the back of a tire already fixed in position on said support.

FRED R. RUEPPEL.
CHARLES W. BALLE.